US010148355B1

(12) United States Patent
Byers et al.

(10) Patent No.: US 10,148,355 B1
(45) Date of Patent: Dec. 4, 2018

(54) MOBILE NETWORK DEVICE MOVABLE ALONG FREE SPACE OPTICAL CEILING-MOUNTED TRACK ENCLOSURE FOR CEILING AS A SERVICE

(71) Applicant: Cisco Technology, Inc., San Jose, CA (US)

(72) Inventors: Charles Calvin Byers, Wheaton, IL (US); Chris Pirics, Bonita Springs, FL (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 15/844,752

(22) Filed: Dec. 18, 2017

(51) Int. Cl.
*H04B 10/116* (2013.01)
*B61B 3/02* (2006.01)
*H04J 14/08* (2006.01)

(52) U.S. Cl.
CPC ............. *H04B 10/116* (2013.01); *B61B 3/02* (2013.01); *H04J 14/08* (2013.01)

(58) Field of Classification Search
CPC .......... H04B 10/116; B61B 3/02; H04J 14/08
USPC ........................................................ 398/118
See application file for complete search history.

(56) References Cited

U.S. PATENT DOCUMENTS

| 6,993,260 | B2 | 1/2006 | Byers et al. |
| 7,110,679 | B2 | 9/2006 | Byers et al. |
| 7,162,158 | B2 | 1/2007 | Byers et al. |
| 8,060,617 | B2 | 11/2011 | Moon |
| 9,149,350 | B2* | 10/2015 | Aheam ................. A61C 19/00 |
| 9,438,337 | B2 | 9/2016 | Byers |
| 9,609,569 | B2 | 3/2017 | Byers et al. |
| 2010/0134341 | A1* | 6/2010 | Priest ..................... G08C 17/02 341/176 |

(Continued)

OTHER PUBLICATIONS

Akella et al., "Building Blocks for Mobile Free-Space-Optical Networks", [online], 2005 IEEE, [retrieved on Oct. 17, 2017]. Retrieved from the Internet: URL: <http://citeseerx.ist.psu.edu/viewdoc/download?doi=10.1.1.365.3650&rep=rep1&type=pdf>, 5 pages.

(Continued)

*Primary Examiner* — Dalzid Singh
(74) *Attorney, Agent, or Firm* — Leon R. Turkevich

(57) ABSTRACT

A mobile network device moves along a track rail structure of a ceiling-mounted track enclosure. The ceiling-mounted track enclosure further comprises a beam transmission cavity for accommodating a collimated light beam having a prescribed cross-sectional area and having been transmitted into the beam transmission cavity by a free space optical transmitter, without obstruction of the collimated light beam by the mobile network device along the track rail structure. The mobile network device receives, at a selected detection area within the cross-sectional area, a modulated light signal transmitted within the collimated light beam. The selected detection area is substantially smaller than the prescribed cross-sectional area and allocated exclusively to the mobile network device. The mobile network device can move toward an identifiable destination position of the track rail structure by a determined arrival time in response to the mobile network device detecting a movement instruction in the modulated light signal.

20 Claims, 6 Drawing Sheets

(56) References Cited

U.S. PATENT DOCUMENTS

2014/0263866 A1* 9/2014 Hemmer ............... F16M 13/00
248/58
2016/0265224 A1 9/2016 Byers et al.

OTHER PUBLICATIONS

Liu et al., "Auto-Configurable Optical Linking Modules for Mobile Free Space Optical Communications", 2004, [retrieved on Dec. 14, 2017]. Retrieved from the Internet: URL: <https://www.researchgate.net/publication/253325615_Auto-Configurable_Optical_Linking_Modules_for_Mobile_Free_Space_Optical_Communications>, pp. 1-4.

Bilgi, "Multi-Transceiver Free-Space-Optical Structures for Mobile Ad-Hoc Networks", [online], Dec. 2010, [retrieved on Oct. 17, 2017]. Retrieved from the Internet: <URL: <https://pdfs.semanticscholar.org/59f1/1a57808aca6777c9d71549b19b5094460b0c.pdf>, 143 pages.

Daifuku, "The Evolution of AMHS", [online], [retrieved on Aug. 7, 2017]. Retrieved from the Internet: URL: <http://www.daifuku.com/solution/technology/semiconductor/>, pp. 1-4.

Hill-Rom, "UltraTwin Overhead Lift", [online], [retrieved on Aug. 7, 2017]. Retrieved from the Internet: URL: <http://www.hill-rom.com/usa/Products/Category/Patient-Handling/Overhead-patient-lifts/UltraTwin/>, 1 page.

"Light Rail", [online], [retrieved on Aug. 7, 2017]. Retrieved from the Internet: URL: <https://www.lightrail3.com/>, pp. 1-4.

Sevincer et al., "Automatic realignment with electric steering of free-space-optical transceivers in MANETs: A proof-of-concept prototype", Ad Hoc Networks 11 (2013), pp. 585-595.

Panelfold, "Moduflex Series 800", [online], [retrieved on Aug. 7, 2017]. Retrieved from the Internet: URL: <http://www.panelfold.com/productsub.asp?categoryID=3&productID=25>, 2 pages.

Siemon, "Simeon introduces new passive ceiling zone enclosure", [online],1995-2017 Siemon, [retrieved on Aug. 21, 2017]. Retrieved from the Internet: URL: <https://siemon.com/uk/company/press_releases/17-01-25-passive-ceiling-zone-enclosure.asp>, 2 pages.

Wikipedia, "Collimated light", [online], Nov. 3, 2017, [retrieved on Nov. 14, 2017]. Retrieved from the Internet: URL: <https://en.wikipedia.org/wiki/Collimated_light>, pp. 1-4.

Wikipedia, "Collimator", [online], Oct. 10, 2017, [retrieved on Nov. 14, 2017]. Retrieved from the Internet: URL: <https://en.wikipedia.org/wiki/Collimator>, pp. 1-4.

Wikipedia, "10G-PON", [online], Apr. 2, 2017, [retrieved on Aug. 7, 2017]. Retrieved from the Internet: URL: <https://en.wikipedia.org/wiki/10G-PON>, pp. 1-6.

Yuksel et al., "Free-space-optical mobile ad hoc networks: Auto-configurable building blocks", [online], Springer Science + Business Media, LLC 2007, [retrieved on Aug. 7, 2017]. Retrieved from the Internet: URL: <https://pdfs.semanticscholar.org/0374/335317332c1334a862a6fd2f5e69cd24e084.pdf>, 18 pages.

Yang et al., U.S. Appl. No. 15/454,991, filed Mar. 9, 2017.

Byers, U.S. Appl. No. 15/493,945, filed Apr. 21, 2017.

ResearchGate: Akella et al., "Building Blocks for Mobile Free-Space-Optical Networks", [online], 2005 IEEE, [retrieved on Aug. 21, 2017]. Retrieved from the Internet: URL: <https://researchgate.net/publication/4146754_Building_blocks_for_mobile_free-space-optical_networks>, 9 pages.

Byers et al., U.S. Appl. No. 15/499,758, filed Apr. 27, 2017.

* cited by examiner

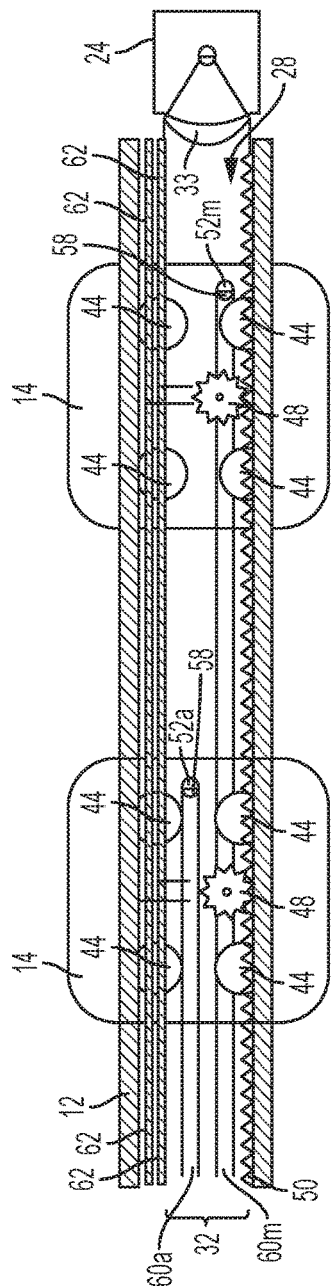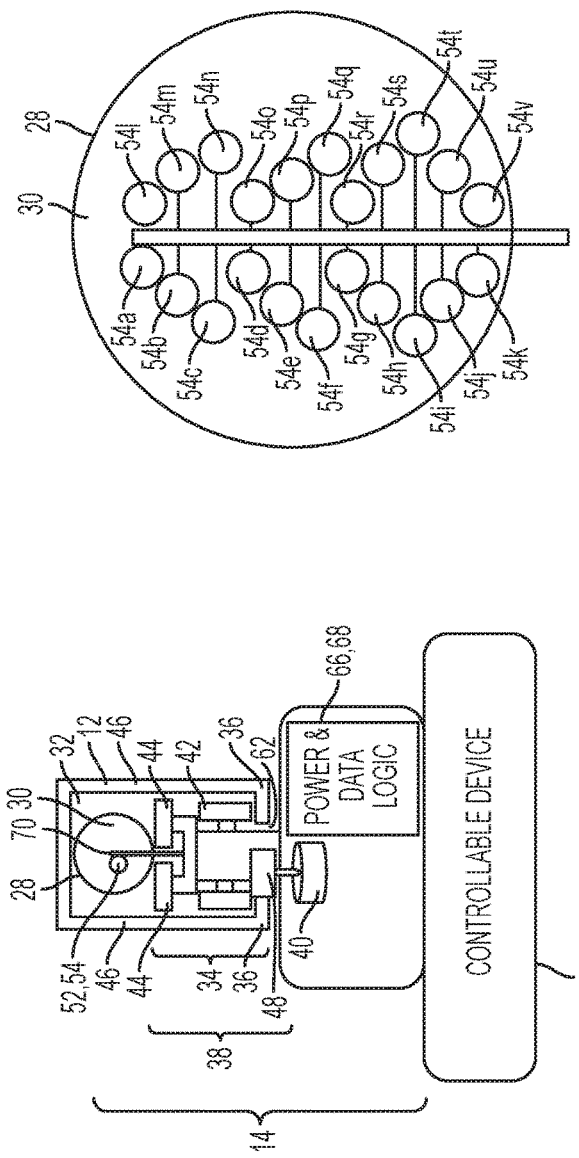

US 10,148,355 B1

MOBILE NETWORK DEVICE MOVABLE ALONG FREE SPACE OPTICAL CEILING-MOUNTED TRACK ENCLOSURE FOR CEILING AS A SERVICE

TECHNICAL FIELD

The present disclosure generally relates to a mobile network device movable along a free space optical ceiling-mounted track enclosure for ceiling as a service.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Digital ceilings enable network devices to be positioned at prescribed locations in a ceiling structure for efficient deployment of network-based services without wasting any "flooring" real estate. Example digital ceilings can be implemented using a grid of power-enabled rails that enable the network devices to be connected at physical Power over Ethernet (PoE) connectors positioned at prescribed segments along the power-enabled rails (e.g., at repeating intervals); digital ceilings also can be implemented using a mesh of Wi-Fi enabled devices installed at prescribed positions of a ceiling.

Digital ceilings also can be implemented using a rail mounted on the ceiling, where the rail can be configured to enclose an electrically-powered robot connected to cables (e.g., data cables or optical fiber cables) within the rail for power and/or control of the electrically-powered robot.

BRIEF DESCRIPTION OF THE DRAWINGS

Reference is made to the attached drawings, wherein elements having the same reference numeral designations represent like elements throughout and wherein:

FIG. 2 illustrates an example top view of the ceiling-mounted track enclosure illustrating in further detail the beam transmission cavity, according to an example embodiment.

FIGS. 3A and 3B illustrate example side views of the ceiling-mounted track enclosure illustrating in further detail the beam transmission cavity, the track rail structure, the mobile network device, and exclusive detection areas for respective mobile network devices, according to an example embodiment.

DESCRIPTION OF EXAMPLE EMBODIMENTS

Overview

Figure 1:
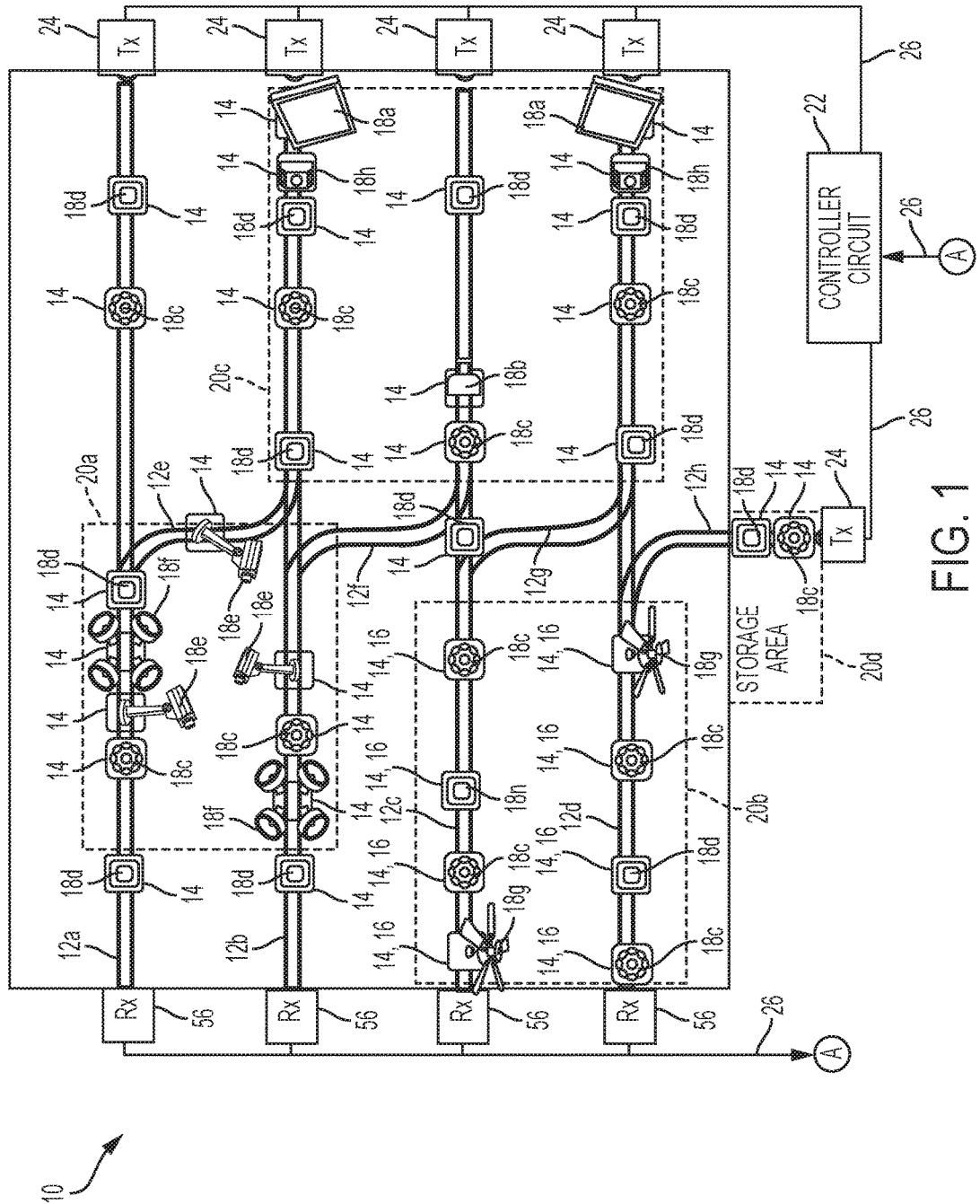
FIG. 1 illustrates a top-level view of an example system having a ceiling-mounted track enclosure comprising a beam transmission cavity and a track rail structure, for controlled movement of mobile network devices along the track rail structure in response to a collimated light beam sending instructions to the mobile network devices via the beam transmission cavity, according to an example embodiment.

In one embodiment, a method comprises positioning, within a beam transmission cavity of a ceiling-mounted track enclosure, a free space optical transmitter for transmission of a collimated light beam having a prescribed cross-sectional area, the beam transmission cavity constructed and arranged for accommodating the collimated light beam, the ceiling-mounted track enclosure further comprising a track rail structure constructed and arranged for supporting movement of a mobile network device along the track rail structure without obstruction of the collimated light beam; causing the free space optical transmitter to transmit, within the collimated light beam, a modulated light signal; and causing the mobile network device to receive the modulated light signal at a selected detection area within the cross-sectional area, the selected detection area allocated exclusively to the mobile network device and the selected detection area substantially smaller than the prescribed cross-sectional area, the modulated light signal including control data for controlling movement of the mobile network device toward an identifiable destination position of the track rail structure by a determined arrival time.

In another embodiment, a system comprises a ceiling-mounted track enclosure, a free space optical transmitter, and a controller circuit. The ceiling-mounted track enclosure comprises a beam transmission cavity and a track rail structure. The beam transmission cavity is constructed and arranged for accommodating a collimated light beam transmitted at a first end of the beam transmission cavity and having a prescribed cross-sectional area. The track rail structure is constructed and arranged for supporting movement of a mobile network device along the track rail structure without obstruction of the collimated light beam. The free space optical transmitter is configured for transmission of the collimated light beam into the first end of the beam transmission cavity. The collimated light beam comprises a modulated light signal including control data. The controller circuit is configured for generating the control data. The controller circuit also is configured for causing the mobile network device to receive the modulated light signal at a selected detection area within the cross-sectional area. The selected detection area is allocated exclusively to the mobile network device and the selected detection area is substantially smaller than the prescribed cross-sectional area. The control data controls movement of the mobile network device toward an identifiable destination position of the track rail structure by a determined arrival time.

In another embodiment, a method comprises positioning a mobile network device for movement along a track rail structure of a ceiling-mounted track enclosure, the ceiling-mounted track enclosure further comprising a beam transmission cavity constructed and arranged for accommodating a collimated light beam having a prescribed cross-sectional area and having been transmitted into the beam transmission cavity by a free space optical transmitter, the track rail structure constructed and arranged for supporting movement of the mobile network device along the track rail structure without obstruction of the collimated light beam; receiving, by the mobile network device at a selected detection area within the cross-sectional area, a modulated light signal transmitted within the collimated light beam, the selected detection area allocated exclusively to the mobile network device and the selected detection area substantially smaller than the prescribed cross-sectional area; and moving, by the mobile network device, toward an identifiable destination position of the track rail structure by a determined arrival time in response to the mobile network device detecting a movement instruction in the modulated light signal.

In another embodiment, an apparatus comprises a motor structure, an optical receiver, and a controller circuit. The motor structure is configured for moving the apparatus along a track rail structure of a ceiling-mounted track enclosure. The ceiling-mounted track enclosure further comprises a beam transmission cavity constructed and arranged for accommodating a collimated light beam having a prescribed cross-sectional area and having been transmitted into the beam transmission cavity by a free space optical transmitter. The track rail structure is constructed and arranged for supporting movement of the apparatus along the track rail structure without obstruction of the collimated light beam. The optical receiver is configured for receiving, at a selected detection area within the cross-sectional area, a modulated light signal transmitted within the collimated light beam, the selected detection area allocated exclusively to the apparatus and the selected detection area substantially smaller than the prescribed cross-sectional area. The controller circuit is configured for detecting a movement instruction in the modulated light signal, the controller circuit configured for causing the motor structure to move the apparatus toward an identifiable destination position of the track rail structure by a determined arrival time in response to the movement instruction.

DETAILED DESCRIPTION

FIG. 1 is a diagram illustrating an example free space optical (FSO) on-demand "ceiling as a service" system 10 comprising one or more ceiling-mounted track enclosures 12 (e.g., 12a-12h of FIG. 1) that enable movement of mobile network devices 14 to respective example identifiable destination positions 16, according to an example embodiment. The "ceiling as a service" system 10 can be deployed, for example, in a large office-type building having an example floor size of one hundred by fifty meters (100 m×50 m) of open floor space; other building types or venues can be used for deployment of the example "ceiling as a service" system 10, for example industrial, educational, entertainment, etc.

Particular embodiments enable a free space optical (FSO) on-demand "ceiling as a service" 10 that enables controllable devices 18 to be allocated at different identified destination positions 16 along a ceiling-mounted track enclosure 12 in order to provide one or more on-demand ceiling service areas 20, for example an on-demand television studio 20a, an on-demand laboratory area (e.g., workstation) 20b, an on-demand auditorium area 20c, or a secure storage area 20d that can store unused mobile network devices 14 (and associated controllable devices 18 until needed). Each of the mobile network devices 14 and associated controllable devices 18 can be individually controlled by a centralized controller circuit 22, described below. Each mobile network device 14 can support a corresponding controllable device 18, illustrated in FIG. 1 as a high-definition television (HDTV) display 18a, an HDTV projector 18b, a "LiFi" access point 18c that transmits and receives data via modulated light emitters, a television studio camera 18e, high-intensity television studio lights 18f, a smart ceiling fan 18g, high-fidelity (HiFi) speakers 18h, etc. Other digitally-controllable devices 18 can be coupled to a mobile network device 14, for example a wide-angle security camera, a robotic manufacturing tool such as a manipulator arm or automated solder tool, a controllable sprayer for dispensing fluid (e.g., water or other solution), etc. The ceiling-mounted track enclosures 12 also can include one or more switching elements configured for enabling any one of the mobile network devices 14 to transfer between different ceiling-mounted track enclosures (e.g., from 12a to 12b via 12e and vice versa; from 12b to 12c via 12f and vice versa; from 12c to 12d via 12g and vice versa; from 12d to 12h and vice versa), change directions, or be reordered along the different ceiling-mounted track enclosures 12.

As described in further detail below, each mobile network device 14 and each associated controllable device 18 can be controlled by the controller circuit device 22 based on the controller circuit device 22 generating and/or supplying control data for controlling any one of the mobile network devices 14 or the controllable devices 18. The "ceiling as a service" system 10 includes, for each ceiling-mounted track enclosure 12, a free space optical (FSO) transmitter 24 that is configured for transmitting a collimated light beam (28 of FIG. 2) having a prescribed cross-sectional area (30 of FIGS. 3A and 3B). Each FSO transmitter device 24 can receive control data and/or broadband data for any one of the mobile network devices 14 and/or controllable devices 18 from the controller circuit device 22 via a wired data link 26, implemented for example as a wired local area network (e.g., an IEEE based data network). Hence, each FSO transmitter device 24 can generate a collimated light beam 28 that includes a modulated light signal (e.g., at least ten gigabits per second (10 Gb/s) or more) including the control data and/or broadband data supplied by the controller circuit device 22.

FIG. 2 illustrates an example top view of the ceiling-mounted track enclosure 12, according to an example embodiment. The ceiling-mounted track enclosure 12 comprises a beam transmission cavity 32 for accommodating transmission of the collimated light beam 28 generated by the FSO transmitter device 24.

FIG. 3A illustrates an example side view of the ceiling-mounted track enclosure 12. As illustrated in FIG. 3A, the ceiling-mounted track enclosure 12 comprises the beam transmission cavity 32 that encloses the collimated light beam 28 transmitted by the FSO transmitter device 24, where the collimated light beam 28 has the prescribed cross-sectional area 30 established by at least a lens 33 of the FSO transmitter device 24 (other optical elements can be used in the FSO transmitter device 24 for generating the collimated light beam 28, for example an optical system comprising one or more lenses and/or other optical elements). The ceiling-mounted track enclosure 12 also comprises a track rail structure 34 constructed and arranged for supporting movement of the mobile network device 14 along the track rail structure 34 without obstruction of the collimated light beam 28. As illustrated in FIGS. 2 and 3A, the ceiling-mounted track enclosure 12 can be constructed as an inverted "U" shape that comprises the beam transmission cavity 32 in the upper portion of the ceiling-mounted track enclosure 12 and the track rail structure 34 in the lower portion of the ceiling-mounted track enclosure 12.

The track rail structure 34 can comprise flanges 36 that provide support for the mobile network device 14, and edge walls 46 that provide side (directional) support for the mobile network device 14. In particular, the mobile network device 14 can comprise an electrically-driven motor structure (i.e., motor assembly) 38 that comprises a controllable drive motor 40, support wheels 42 that engage the flanges 36, guide wheels 44 that guide the mobile network device 14 within the edge walls 46 of the ceiling-mounted track enclosure 12, and a drive gear (48 of FIGS. 2 and 3A) that is driven by the drive motor 40 and engages with drive teeth 50 mounted along one or more of the edge walls 46.

Hence, the motor assembly 38 is configured for moving the mobile network device 14 along the track rail structure 34, where the track rail structure 34 is constructed and arranged for supporting movement of the mobile network device 14 along the track rail structure 34 without obstruction of the collimated light beam 28 that is transmitted within the beam transmission cavity 32.

Each mobile network device 14 also includes an optical sensor 52 that is allocated its own exclusive selected detection area 54 that ensures that the optical sensor of a given mobile network device 14 does not optically interfere with any other optical sensor 52 of any other mobile network device 14 on the ceiling-mounted track enclosure 12. As illustrated in FIG. 1, the FSO transmitter devices 24 are positioned at a first "East" end of the beam transmission cavity (32 of FIG. 2) of the corresponding ceiling-mounted track enclosure 12 for transmission of the collimated light beam (28 of FIG. 2); the "ceiling as a service" system 10 also includes one or more free space optical receivers (56 of FIG. 1) that are positioned at a second "West" end of the beam transmission cavity 32, where the second "West" end of the beam transmission cavity 32 is opposite the corresponding "East" end of beam transmission cavity 32 that receives the collimated light beam 28 from the one or more FSO transmitter devices 24. In another embodiment, the FSO transmitter devices 24 and the FSO receivers 56 also can be combined into FSO transceiver devices that can implement the one or more bidirectional free space optical links in the collimated light beam 28, for example based on an FSO transmitter transmitting at a first transmit wavelength and an FSO receiver receiving a second collimated light beam (e.g., transmitted by a mobile network device 14, described below) at a second different receive wavelength.

FIG. 3B illustrates example exclusive selected detection areas 54 (e.g., 54a through 54v) that can be allocated to respective optical sensors 52 by the controller circuit device 22, as viewed by an optical receiver device 56 at the second "West" end of the beam transmission cavity 32. As illustrated in FIG. 3B, each exclusive selected detection area 54 is substantially smaller in area than the prescribed cross-sectional area 30. Further, each optical sensor 52 is constructed and arranged to have an area substantially corresponding to the exclusive selected detection area 54. As described below, each mobile network device 14 comprises a sensor actuator arm 70 configured for moving (in two dimensions X, Y), the corresponding optical sensor 52 to an allocated exclusive selected detection area 54 in response to a sensor position instruction generated by the controller circuit device 22 and specifying the allocated exclusive selected detection area 54. Hence, the controller circuit device 22 can exclusively allocate, to each mobile network device 14, a corresponding exclusive selected detection area 54 (e.g., 54a of FIG. 3B) that guarantees that no other optical sensor 52 (e.g., 52m of FIG. 2) of another mobile network device 14 optically interferes with the optical sensor 52 (e.g., 52a of FIG. 2 at the corresponding selected detection area 54a) of the corresponding mobile network device 14.

Hence, multiple mobile network devices 14 can move along the same track rail structure 34, without obstruction of the collimated light beam 28 in the beam transmission cavity 32. As illustrated in FIGS. 2 and 3A, the track rail structure 34 also can include one or more electrical bus bars 62 constructed and arranged for supplying electrical power (e.g., direct current (DC) or alternating current (AC)) to the motor assembly 38 via brushes, etc. mounted on the motor assembly 38 for engagement with the electrical bus bar 62.

Further, each mobile network device 14 also can include an optical transmitter 58 that is positioned at the exclusive selected detection area 54, opposite the corresponding optical sensor 52. As illustrated in FIG. 2, each mobile optical transmitter 58 is positioned opposite the corresponding optical sensor 52 (i.e., on the "shadow" side of the optical sensor 52), such that each mobile optical transmitter 58 can transmit, at the corresponding exclusive selected detection area 54, a second collimated light beam (e.g., 60a, 60m) in the same "Westward" direction that the collimated light beam 28 was transmitted; hence, each mobile optical transmitter 58 can exploit the shadow that is created by the corresponding optical sensor 52 at the corresponding exclusive selected detection area 54 by transmitting a corresponding mobile device-initiated collimated light beam 60 for reception by an optical receiver device 56. Hence, the mobile network device 14 can transmit, via its mobile optical transmitter 58, a corresponding mobile device-initiated collimated light beam 60 that carries telemetry data and/or broadband data generated by the mobile network device 14 and/or the corresponding controllable device 18.

Hence, the particular embodiments include a ceiling-mounted track enclosure 12, and one or more mobile network devices 14 mounted within a track rail structure 34 of the ceiling-mounted track enclosure 12. The ceiling-mounted track enclosure 12 also includes a beam transmission cavity 32 for transmission of a collimated light beam (e.g., an incoherent light beam generated by a FSO transmitter) 28 having a prescribed cross-sectional area 30.

Further, the track rail structure 34 is constructed and arranged for supporting movement of the mobile network device 14, along the track rail structure 34, without obstruction of the collimated light beam 28, based on each mobile network device 14 comprising an optical sensor 52 for receiving the collimated light beam 28 at a corresponding selected detection area 54: the selected detection area 54 is allocated exclusively to the mobile network device 14 and is substantially smaller than the cross-sectional area 30 of the collimated light beam 28. A mobile network device 14 also can transmit, at the selected detection area 54, a second collimated light beam 60 toward an optical receiver 56 located at an opposite end of the beam transmission cavity 32 relative to the FSO transmitter 24.

Hence, the controller circuit 22 can dynamically control multiple broadband devices 18 supported by respective mobile network devices 14 mounted on the ceiling-mounted track enclosure 12, based on sending, in the collimated light beam 28, a modulated light signal that includes control data for controlling movement of the mobile network devices 14 toward identifiable destination positions 16 of the track rail structure by a determined arrival time (the identifiable destination positions 16 are illustrated only within the on-demand laboratory area 20b of FIG. 1 to avoid cluttering). Each mobile network device 14 can be physically coupled to its corresponding controllable device 18 via a wired data connection (not shown). The dynamic control of the mobile network devices (e.g., on a minute-by-minute basis) 14 enables the controller circuit 22 to dynamically establish ceiling service areas 20 serviced by one or more controllable devices 18 supported by respective mobile network devices 14, based on sending broadband data and/or control data via the collimated light beam 28 propagated in the beam transmission cavity 32. Further, each mobile network device 14 can be allocated a corresponding time interval according to a time division multiplexing of the modulated light signal (and/or wavelength division for wavelength division multiplexing), for multiplexed control of each of the mobile network devices 14 on the ceiling-mounted track enclosure 12.

Hence, the example embodiments enable dynamic deployment of one or more ceiling service areas 20, where multiple controlled devices 18 can be moved precisely to identifiable destination positions 16 for deployment of network-based services associated with the ceiling service area 20, within one or two minutes, without the need for network cabling for the multiple controlled devices; the example embodiments also can be applied for load balancing between the mobile network devices 14.

Figure 4:
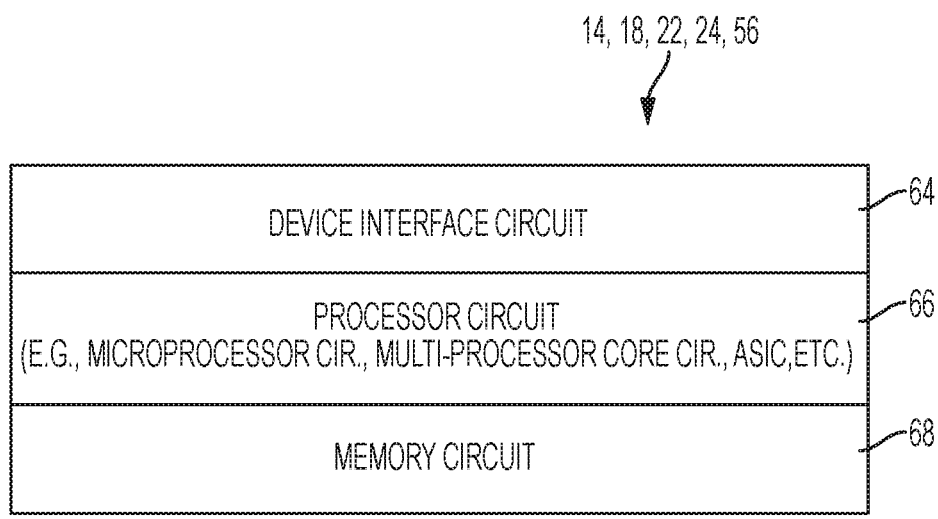
FIG. 4 illustrates an example implementation of any one of the mobile network device, the free space optical transmitter, and/or the controller circuit of FIGS. 1-3, according to an example embodiment.

FIG. 4 illustrates in further detail an example implementation of any one of the mobile network devices 14, controllable devices 18, controller circuit device 22, FSO transmitter device 24, and/or optical receiver device 56, according to an example embodiment. Each apparatus 14, 18, 22, 24, and/or 56 is configured for network communications with other physical machines via a data network such as an IEEE-based data network 10. The term "configured for" or "configured to" as used herein with respect to a specified operation refers to a device and/or machine that is physically constructed and arranged to perform the specified operation.

Each apparatus 14, 18, 22, 24, and/or 56 can include a device interface circuit 64, a processor circuit 66, and a memory circuit 68. The device interface circuit 64 can include one or more distinct physical layer transceivers (e.g., the optical sensor 52 and/or the mobile optical transmitter 58 for the mobile network device 14) for communication with any one of the other devices 14, 18, 22, 24, and/or 56; the device interface circuit 64 also can include an IEEE based Ethernet transceiver for communications with the devices of FIG. 1 via any type of data link, as appropriate as described herein (e.g., a wired link 26, a wireless link, or an optical link 28, 60, etc.). The processor circuit 66 can be configured for executing any of the operations described herein, and the memory circuit 68 can be configured for storing any data or data packets as described herein.

Any of the disclosed circuits of the devices 14, 18, 22, 24, and/or 56 (including the device interface circuit 64, the processor circuit 66, the memory circuit 68, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 68) causes the integrated circuit(s) implementing the processor circuit to store application state variables in processor memory, creating an executable application resource (e.g., an application instance) that performs the operations of the circuit as described herein.

Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 68 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 68 can be implemented dynamically by the processor circuit 66, for example based on memory address assignment and partitioning executed by the processor circuit 66.

Figure 5A:
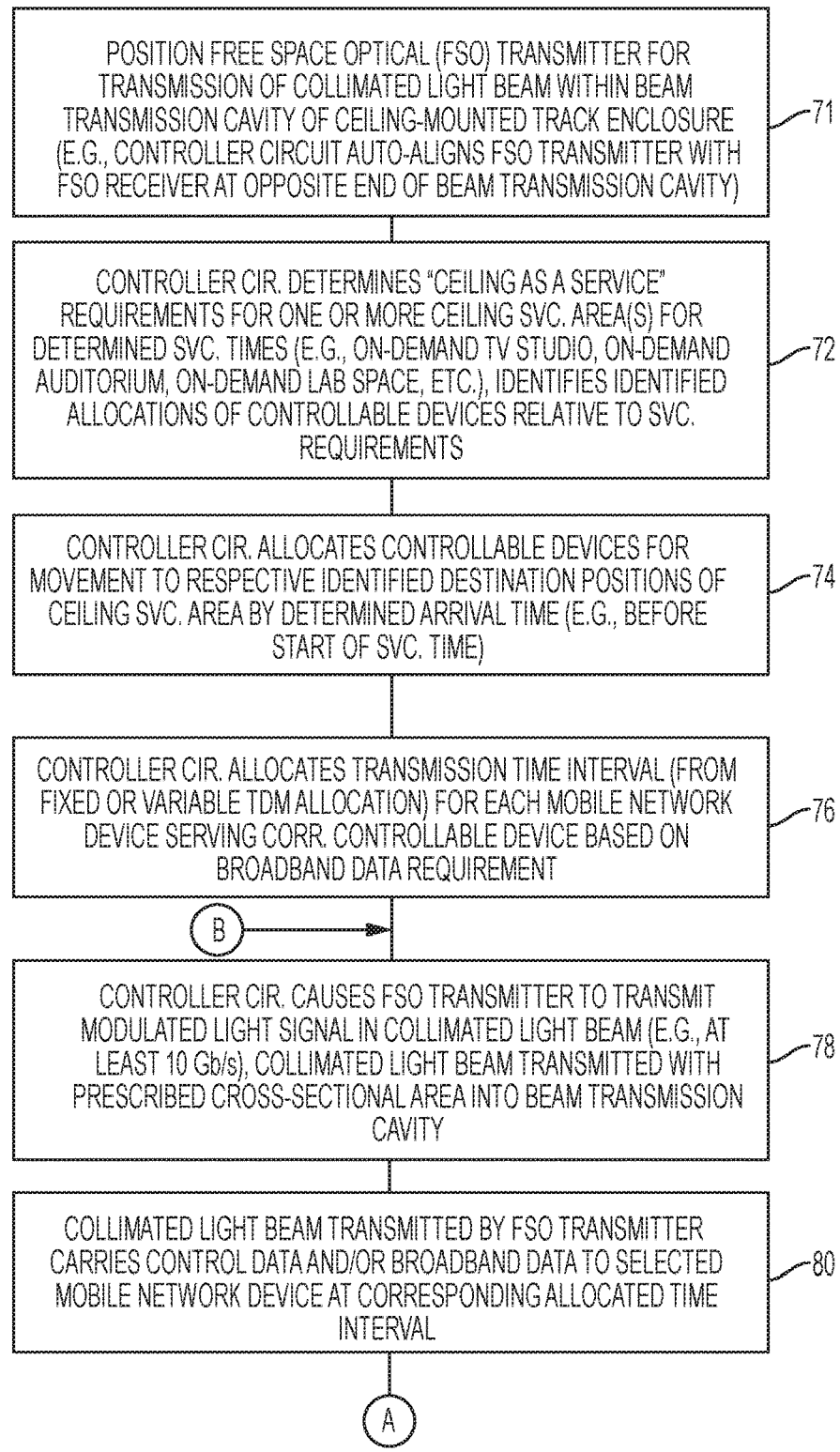
FIGS. 5A-5B illustrate an example method of controlled movement of the mobile network devices along the track rail structure in response to the collimated light beam transmitted via the beam transmission cavity, according to an example embodiment.
Figure 5B:
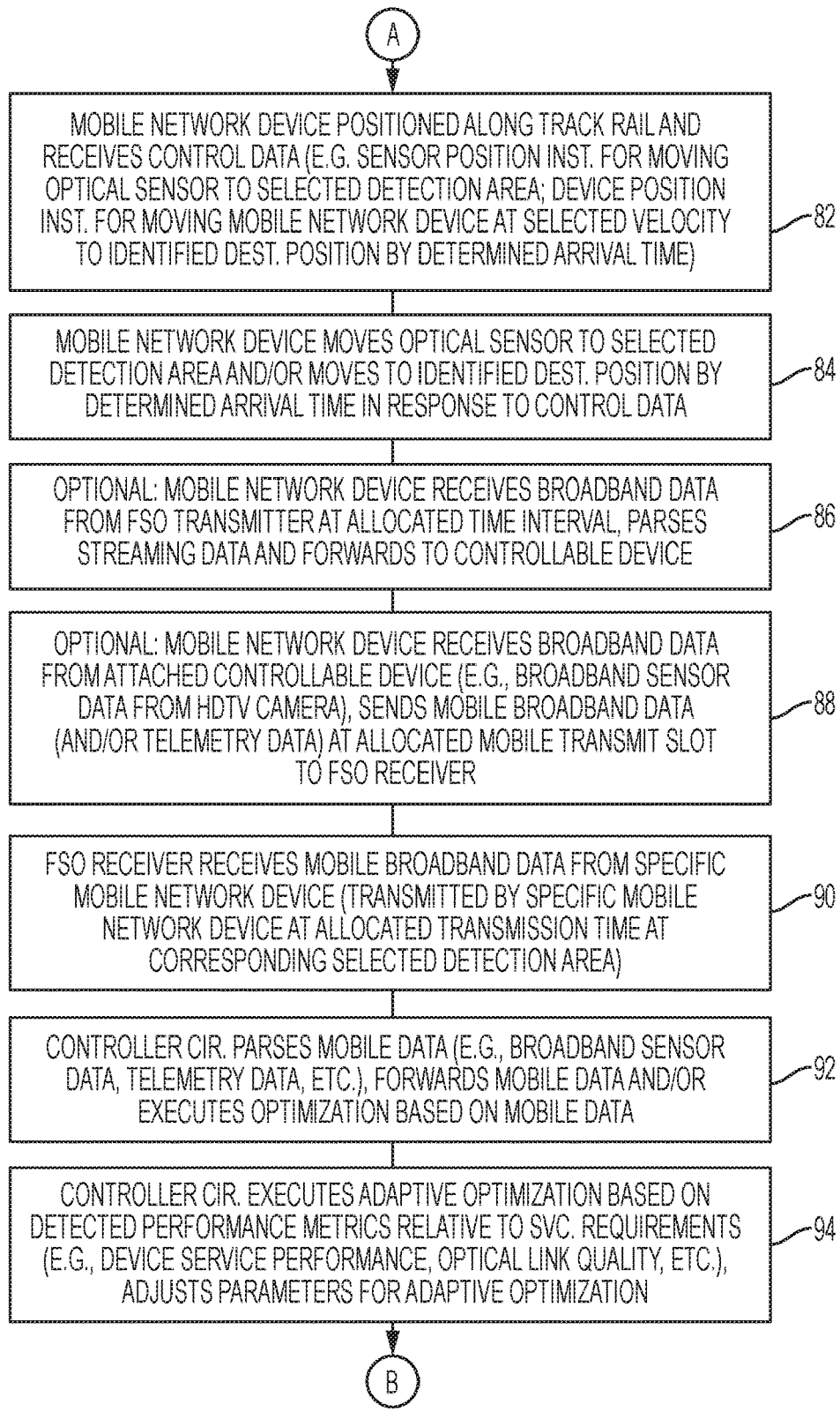
Figure 6:
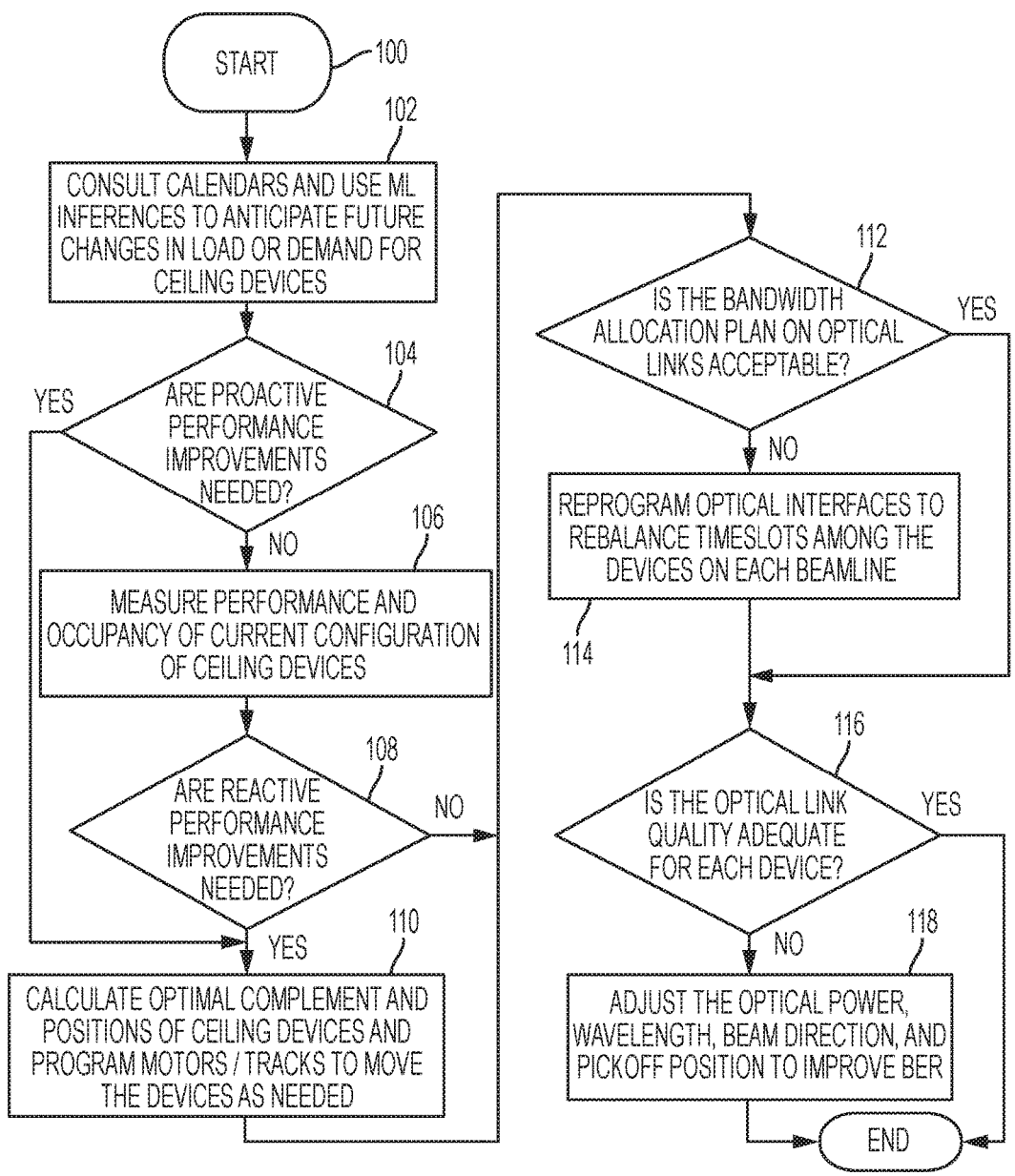
FIG. 6 illustrates an example optimization of the mobile network device by the controller circuit, according to an example embodiment.

FIGS. 5A-5B illustrate an example method of controlled movement of the mobile network devices along the track rail structure in response to the collimated light beam transmitted via the beam transmission cavity, according to an example embodiment. FIG. 6 illustrates an example optimization of the mobile network device by the controller circuit, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 5A, each FSO transmitter device 24 is positioned in operation 71 as illustrated in FIGS. 1-3 for transmission of the collimated light beam 28 within the beam transmission cavity 32 of the ceiling-mounted track enclosure 12. For example, the processor circuit 66 of the controller circuit device 22 in operation can execute an auto-alignment procedure using the FSO transmitter device 24 and the optical receiver device 56, where associated actuators (not shown) can engage with each FSO transmitter device 24 and associated optical receiver device 56 of a given ceiling-mounted track enclosure 12 to align the collimated light beam 28 within the beam transmission cavity 32 such that the entire prescribed cross-sectional area 30 of the collimated light beam 28 can be received by the optical receiver device 56 at the opposite end of the beam transmission cavity 32. Hence, information regarding any misalignment detected by an optical receiver device 56 can be sent by the optical receiver device 56 to the controller circuit device 22, and in response the controller circuit device 22 can send an adjustment command causing realignment of the collimated light beam 28 by the FSO transmitter device 24 or an actuator associated with the FSO transmitter device 24. The positioning in operation 71 can be performed before any of the mobile network devices 14 are moved into position on the ceiling-mounted track enclosure 12; alternately, the positioning can be performed while one or more of the mobile network devices 14 are in position, as illustrated in FIG. 3A or FIG. 3B, as the optical receiver device 56 can detect the boundary of the prescribed cross-sectional area 30 such that reception of the collimated light beam 28 as a perfect circle (as opposed to oval) can be used to identify an aligned position of the collimated light beam 28 within the beam transmission cavity 32.

The processor circuit 66 of the controller circuit device 22 in operation 72 can determine service requirements for different ceiling-based services, for example an on-demand television studio 20a having a particular scheduled service time (e.g., daily at 8:00 AM and 3:00 PM for one hour), an on-demand laboratory area 20b (e.g., every Monday, Wednesday, and Friday from 7:00 AM to 11:00 AM), and an on-demand auditorium area 20c (e.g., daily from 8:00 AM to Noon and 1:00 PM to 4:00 PM). Other ceiling-based services can be scheduled at different times, for example a staff meeting every work day (Monday through Friday, except holidays) from 4:00 PM to 5:00 PM encompassing the entire area served by the ceiling-mounted track enclosures 12a 12b, 12c, and 12d. The processor circuit 66 of the controller circuit device 22 can determine service requirements in terms of types of devices required (e.g., 18a through 18g), the required device capacity (e.g., based on number of scheduled participants, or number of detected participants that are detected by a wide-angle security camera coupled to one of the mobile network devices 14), and the required network capacity (e.g., bandwidth, throughput, etc. for the scheduled on-demand ceiling service area 20.

The processor circuit 66 of the controller circuit device 22 in operation 72 also can determine from a stored inventory list (e.g., in its memory circuit 68) the identified allocations of controllable devices 18 to identify whether controllable devices 18 are in use (busy, unavailable, already allocated, etc.) or available for a determined service time for the on-demand ceiling service area 20 (e.g., 20a). The processor circuit 66 of the controller circuit device 22 in operation 72 allocates in operation 74 identified controllable devices 18 for movement, by the respective mobile network devices 14, to identified destination positions 16 within the on-demand ceiling service area 20 (e.g., 20a) by the determined arrival time that preferably coincides with a few minutes before the start of the scheduled service time. The processor circuit 66 of the controller circuit device 22 can generate, for execution by a specific mobile network device 14, a movement instruction that specifies the identifiable destination position and the determined arrival time.

The processor circuit 66 of the controller circuit device 22 in operation 76 also can allocate bandwidth from a time division multiplexing of the collimated light beam 28, for each mobile network device 14 that serves the corresponding controllable device 18, based on the broadband data requirements of the corresponding controllable device 18 during the scheduled service time at the on-demand ceiling service area 20 (e.g., 20a). For example, the processor circuit 66 of the controller circuit device 22 can determine that an HDTV display 18a has high broadband data requirements, whereas the high-intensity television studio lights 18f or the smart ceiling fan 18g have minimal data requirements. Hence, the processor circuit 66 of the controller circuit device 22 can allocate a large (variable) time interval of the collimated light beam 28 to the mobile network device 14 associated with the HDTV display 18a (if the TDM-based allocation of the collimated light beam 28 uses variable time intervals) or a large number of fixed timeslots to the mobile network device 14 associated with the HDTV display 18a (if the TDM-based allocation of the collimated light beam 28 uses a prescribed number of fixed, equal-sized and repeating timeslots); the processor circuit 66 of the controller circuit device 22 also can allocate a small (variable) time interval (or a small number of fixed timeslots) to a mobile network device 14 associated with a controllable device 18 having minimal data requirements (e.g., 18e, 18f, 18g). Similarly, the processor circuit 66 of the controller circuit device 22 can allocate a mobile transmission time interval that allocates an exclusive time interval for transmission to an optical receiver device 56, by the mobile optical transmitter 58 of the mobile network device 14 via the mobile device-initiated collimated light beam 60, of telemetry data and/or broadband data originated by the controllable device 18 and/or the mobile network device 14. Allocation of time intervals (and/or wavelength) can be estimated by the controller circuit device 22 prior to initiation of a service, and can be adjusted as needed during service based on any one or more of latency, network traffic, buffer utilization and/or congestion (queue lengths), etc.)

Each mobile network device 14 can be uniquely addressable by the controller circuit device 22, for example based on each mobile network device 14 being allocated a corresponding unique Internet Protocol (IP) address. Hence, the processor circuit 66 of the controller circuit device 22 in operation 78 can cause one or more of the FSO transmitter devices 24 to transmit a modulated light signal within the collimated light beam 28, at a data rate of at least 10 Gigabits per second (Gb/s) or higher, including up to 1 Terabit per second. The FSO transmitter device 24 in operation 78 can transmit a collimated light beam 28, having the prescribed cross-sectional area 30 and carrying the modulated light signal, into the beam transmission cavity 32.

As illustrated in operation 80, the collimated light beam 28 transmitted by the FSO transmitter device 24 can include (within the modulated light signal) a control data message and/or broadband data for an identified mobile network device 14: the modulated light signal can transmit a control data message, generated by the controller circuit device 22, specifying an IP address for a given mobile network device

14. The control data message for the identified mobile network device 14 (identified by the destination IP address specified in the control data message) can be transmitted to the selected mobile network device 14 at the corresponding allocated time interval, and can specify any one of a movement instruction for movement along the ceiling-mounted track enclosure 12, a sensor position instruction, a diagnostic instruction, etc.

Referring to FIG. 5B, a mobile network device 14 in operation 82 can be positioned along a track rail structure 34, for example based on the motor assembly 38 of the mobile network device 14 including executable software that controls the mobile network device 14 moving itself from a storage area 20*d* and mounting itself onto a track rail structure 34. The optical sensor 52 of the device interface circuit 64 of the mobile network device 14 in operation 82 can receive a control data message from the collimated light beam 28. The processor circuit 66 of the mobile network device 14 in operation 82 can detect that the control data message includes a sensor position instruction for controlling movement of the optical sensor 52, by a two-dimensional (X-Y) actuator arm 70 associated with the device interface circuit 64 of the mobile network device 14, to the corresponding allocated exclusive selected detection area 54. In another embodiment, the processor circuit 66 of the mobile network device 14 in operation 82 can retrieve a stored sensor position instruction from its memory circuit 68, for example as an initial (default) sensor position for use by the mobile network device 14.

The processor circuit 66 of the mobile network device 14 in operation 82 also can detect a device position instruction (i.e., a movement instruction) that instructs the mobile network device 14 to move (e.g., at a specified velocity), to an identified destination position 16 by a determined arrival time specified in the movement instruction.

The processor circuit 66 of the mobile network device 14 in operation 84 can respond to a sensor position instruction in the control data message, for example by causing the sensor actuator arm 70 to move the optical sensor 52 (and the mobile optical transmitter 58) to the exclusive selected detection area 54 specified by the sensor position instruction. The processor circuit 66 of the mobile network device 14 in operation 84 also can respond to a movement instruction (specifying an identifiable destination position 16 and a determined arrival time) by causing the motor assembly 38 to move the mobile network device 14 to the identified destination position 16 by the determined arrival time. The control data message also can specify the corresponding transmission time interval (relative to a network clock) allocated to the mobile network device 14 for reception of control data and/or broadband data from the collimated light beam 28, and/or the corresponding mobile transmission time interval allocated to the mobile network device 14 for transmission of data via a corresponding mobile device-initiated collimated light beam 60 to an optical receiver device 56.

Hence, the mobile network device 14, in response to the received control data message via the collimated light beam 28, can move to its identifiable destination position 16 by the determined arrival time to enable the associated controllable device 18 to begin service within the on-demand ceiling service area 20 at the scheduled service time. Depending on implementation of the associated controllable device 18 and the time intervals allocated to the mobile network device 14, the device interface circuit 64 of the mobile network device 14 (via the optical sensor 52) in operation 86 can receive broadband data from the FSO transmitter device 24 at the allocated time interval; the processor circuit 66 of the mobile network device 14 can parse in operation 86 streaming data (e.g., high-definition video) from the received broadband data, and forward the streaming data to the controllable device (e.g., an HDTV display 18*a*, an HDTV projector 18*b*, or a LiFi access point 18*c*, etc.) for presentation by the controllable device 18 within the on-demand ceiling service area 20.

The mobile network device 14 in operation 88 also can receive broadband data supplied by the attached controllable device (e.g., a WiFi access point 18*d*, a television studio camera 18*e*, etc.), and send the broadband data at the allocated mobile transmission time interval (i.e., mobile transmit slot) via its mobile optical transmitter 58 to the optical receiver device 56; the mobile network device 14 in operation 88 also can send telemetry data describing device performance parameters for any one of the mobile network device 14 and/or the associated controllable device 18.

The optical receiver device 56 in operation 90 can receive the mobile device-initiated collimated light beam 60 carrying the mobile data transmitted by a specific mobile network device 14 (e.g., telemetry data and/or broadband data) at the corresponding mobile transmit slot at the corresponding exclusive selected detection area 54, and in response forward the received mobile data to the controller circuit device 22 via the wired data link 26. The controller circuit device 22 in operation 92 can parse the mobile data (e.g., broadband sensor data, telemetry data, etc.), and can forward the mobile data and/or execute optimization on the received mobile data, as appropriate (e.g., to a router device and/or gateway device providing reachability to a destination device configured for consuming the mobile data). The optical receiver device 56 also can send optical receiver performance data to the controller circuit device 22, including for example optical link quality, bit error rate, etc.

The processor circuit 66 of the controller circuit device 22 in operation 92 also can execute adaptive optimization based on detected performance metrics associated with any one of the mobile network devices 14 or the controllable devices 18 (e.g., specified in the telemetry data and/or determined from the broadband data), the optical receiver performance data (e.g., optical link quality, bit error rate, etc.), and in response adjust any one of the allocated parameters to optimize performance. In particular, the processor circuit 66 of the controller circuit device 22 in operation 92 can detect performance metrics associated with one or more of the controllable devices 18 relative to determined service requirements for any on-demand ceiling service area 20, including device service performance of a corresponding controllable device 18 relative to a ceiling service area 20 serviced by the identifiable destination position 16, for example if the on-demand ceiling service area 20 has insufficient WiFi service by a controllable device 18, or whether the on-demand ceiling service area 20 has insufficient cooling by a smart ceiling fan 18*g*, or whether an additional LiFi access point 18*c* is needed; the processor circuit 66 of the controller circuit device 22 in operation 92 also can detect performance metrics relative to the optical link quality between the free space optical transmitter 24 and one or more of the mobile network devices 14 (or the optical link quality between a mobile network device 14 and an optical receiver device 56). The detection of performance metrics relative to the optical link quality is particularly beneficial, as the optical link quality may fluctuate in response to vibration, temperature changes in the optical components, aerosols (e.g., dust) in the atmosphere, etc.

In response to determining the detected performance metrics relative to the service requirements for an on-demand ceiling service area 20, the processor circuit 66 of the controller circuit device 22 in operation 94 can adjust any one or more allocated parameters to adaptively optimize performance of any one or more controllable device 18 within an on-demand ceiling service area 20. For example, the controller circuit device 22 can adjust the corresponding time interval for a mobile network device 14 receiving data from the collimated light beam 28; the controller circuit device 22 also can adjust the mobile transmission time interval for a mobile network device 14 transmitting data via its mobile optical transmitter 58 to an optical receiver device 56; the controller circuit device 22 also can change the selected detection area 54, for example to mitigate against detected sub-optimal propagation of the collimated light beam 28 (e.g., due to a temporary debris obstructing part of the collimated light beam 28); the controller circuit device 22 also can adjust the identifiable destination position 16 for one or more of the mobile network devices 14, for example to accommodate an additional controllable device 18 being moved into service in the on-demand ceiling service area 20 to correct for any detected deficiency in the detected performance metrics.

The controller circuit device 22 in operation 94 also can adjust one or one or more optical transmission parameters of the free space optical transmitter 24 and/or 58, for optimization of one or more of the controllable devices 18 executing the determined service requirements.

FIG. 6 illustrates an example optimization that can be executed by the controller circuit device 22. The controller circuit device 22 in operation 100 can start by accessing in operation 102 online calendars, usage history patterns, etc. and executing machine learning (ML) inferences to predict future changes in load or demand for the on-demand ceiling service areas 20 serviced by the controllable devices 18. If in operation 104 the controller circuit device 22 determines that proactive performance improvements are needed, the controller circuit device 22 can proactively begin executing operation 110; if in operation 104 the controller circuit device 22 determines no proactive performance improvements are needed, the controller circuit device 22 in operation 106 can measure detected performance metrics as described above with respect to operation 94.

If the controller circuit device 22 determines in operation 108 that reactive performance improvements are needed (for example, as described in operation 94), the controller circuit device 22 in operation 110 can calculate an optimization based on determining the optimal complement and positions of the controllable devices 18, and can send a movement instruction to the associated mobile network devices 14 for deployment of the necessary controllable devices 18.

If in operation 112 the controller circuit device 22 determines that the bandwidth allocation on the optical links 28 is not acceptable based on prescribed detection heuristics, the controller circuit device 22 in operation 114 can re-allocate the time intervals among the mobile network devices 14 on a given ceiling-mounted track enclosure 12. If in operation 116 the optical link quality is not adequate for each mobile network device 14, the controller circuit device 22 in operation 118 can adjust various parameters, including optical power, wavelength, beam direction/alignment, and "pickoff" position (i.e., the exclusive selected detection area 54), to improve bit error rate.

According to example embodiments, mobile network devices are movable along a free space optical ceiling-mounted track enclosure to dynamically provide a ceiling-as-a-service, where on-demand ceiling service areas can be dynamically deployed, according to service requirements, without the necessity of network cabling in the ceiling devices providing the ceiling-based services. The elimination of network cabling eliminates many problems associated with network cables, including cable installation efforts, the weight associated with numerous network cables, etc. Moreover, wireless network connectivity can be dynamically adjusted based on dynamic reposition of WiFi and/or LiFi access points to different ceiling service areas in response to predicted or determined increases in demand. Use of free space optical light beams also reduces deployment costs relative to the relatively high cost of manual installation of cable-based ceiling devices, as needed; further, radio-based interconnect technologies may not have the sufficient spectrum/bandwidth to manage the high capacity of the ceiling devices, especially large arrays of Li-Fi access points.

The example embodiments also can dramatically reduce costs associated with installation of ceiling fixtures and ceiling reconfiguration, as the example embodiments enable on-demand deployment of ceiling devices. The example embodiments can be applied to various floor spaces, for example retail spaces, hospitality spaces, education spaces, healthcare spaces, manufacturing spaces, commercial or industrial spaces, entertainment spaces, etc.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    positioning, within a beam transmission cavity of a ceiling-mounted track enclosure, a free space optical transmitter for transmission of a collimated light beam having a prescribed cross-sectional area, the beam transmission cavity constructed and arranged for accommodating the collimated light beam, the ceiling-mounted track enclosure further comprising a track rail structure constructed and arranged for supporting movement of a mobile network device along the track rail structure without obstruction of the collimated light beam;
    causing the free space optical transmitter to transmit, within the collimated light beam, a modulated light signal; and
    causing the mobile network device to receive the modulated light signal at a selected detection area within the cross-sectional area, the selected detection area allocated exclusively to the mobile network device and the selected detection area substantially smaller than the prescribed cross-sectional area, the modulated light signal including control data for controlling movement of the mobile network device toward an identifiable destination position of the track rail structure by a determined arrival time.

2. The method of claim 1, wherein the modulated light signal further includes a sensor position instruction for controlling movement of an optical sensor, by the mobile network device, to the selected detection area, the optical sensor having an area substantially corresponding to the selected detection area.

3. The method of claim 1, wherein the free space optical transmitter transmits the collimated light beam into a first end of the beam transmission cavity, the method further comprising receiving, by an optical receiver at a second end of the beam transmission cavity, a second collimated light beam transmitted by the mobile network device at the selected detection area and carrying second data originated by the mobile network device.

4. The method of claim 1, further comprising determining the determined arrival time and the identifiable destination position based on determining service requirements of a ceiling service area serviced by the identifiable destination position, relative to an identified allocation of a controllable device coupled to the mobile network device via a wired data connection and configured for one of sending or receiving data via the mobile network device and the beam transmission cavity, and relative to other available mobile network devices supporting respective controllable devices.

5. The method of claim 1, further comprising:
allocating, for each of a plurality of the mobile network devices on the ceiling-mounted track enclosure and having respective selected detection areas, a corresponding time interval from a time division multiplexing of the modulated light signal, each time interval allocated based on a corresponding determined broadband data requirement for a corresponding controllable device coupled to the mobile network device via a corresponding wired data connection; and
transmitting, to each mobile network device, a corresponding data transmission on the modulated light beam, at a data rate of at least ten gigabits per second (10 Gb/s), for supply of data according to the corresponding determined broadband data requirement.

6. The method of claim 5, further comprising:
detecting performance metrics associated with one or more of the controllable devices relative to determined service requirements along the ceiling-mounted track enclosure, the performance metrics including any one or more of device service performance of a corresponding controllable device relative to a ceiling service area serviced by the identifiable destination position, or optical link quality between the free space optical transmitter and one or more of the mobile network devices;
adjusting any one or more of the time interval, the selected detection area, or the identifiable destination position for one or more of the mobile network devices, or one or more transmission parameters of the free space optical transmitter, for optimization of one or more of the controllable devices executing the determined service requirements, based on the performance metrics.

7. A system comprising:
a ceiling-mounted track enclosure comprising a beam transmission cavity and a track rail structure, the beam transmission cavity constructed and arranged for accommodating a collimated light beam transmitted at a first end of the beam transmission cavity and having a prescribed cross-sectional area, the track rail structure constructed and arranged for supporting movement of a mobile network device along the track rail structure without obstruction of the collimated light beam;
a free space optical transmitter configured for transmission of the collimated light beam into the first end of the beam transmission cavity, the collimated light beam comprising a modulated light signal including control data; and
a controller circuit configured for generating the control data, the controller circuit configured for causing the mobile network device to receive the modulated light signal at a selected detection area within the cross-sectional area, the selected detection area allocated exclusively to the mobile network device and the selected detection area substantially smaller than the prescribed cross-sectional area, the control data controlling movement of the mobile network device toward an identifiable destination position of the track rail structure by a determined arrival time.

8. The system of claim 7, wherein the controller circuit is configured for adding to the modulated light signal a sensor position instruction for controlling movement of an optical sensor, by the mobile network device, to the selected detection area, the optical sensor having an area substantially corresponding to the selected detection area.

9. The system of claim 7, further comprising an optical receiver configured for receiving, at a second end of the beam transmission cavity, a second collimated beam transmitted by the mobile network device at the selected detection area and carrying second data originated by the mobile network device.

10. The system of claim 7, wherein the controller circuit is configured for determining the determined arrival time and the identifiable destination position based on determining service requirements of a ceiling service area serviced by the identifiable destination position, relative to an identified allocation of a controllable device coupled to the mobile network device via a wired data connection and configured for one of sending or receiving data via the mobile network device and the beam transmission cavity, and relative to other available mobile network devices supporting respective controllable devices.

11. The system of claim 7, wherein:
the controller circuit is configured for allocating, for each of a plurality of the mobile network devices on the ceiling-mounted track enclosure and having respective selected detection areas, a corresponding time interval from a time division multiplexing of the modulated light signal, each time interval allocated based on a corresponding determined broadband data requirement for a corresponding controllable device coupled to the mobile network device via a corresponding wired data connection;
the controller circuit configured for causing the free space optical transmitter to transmit, to each mobile network device, a corresponding data transmission on the modulated light beam, at a data rate of at least ten gigabits per second (10 Gb/s), for supply of data according to the corresponding determined broadband data requirement.

12. The system of claim 7, wherein:
the controller circuit is configured for detecting performance metrics associated with one or more of the controllable devices relative to determined service requirements along the ceiling-mounted track enclosure, the performance metrics including any one or more of device service performance of a corresponding controllable device relative to a ceiling service area serviced by the identifiable destination position, or optical link quality between the free space optical transmitter and one or more of the mobile network devices;
the controller circuit configured for adjusting any one or more of the time interval, the selected detection area, or the identifiable destination position for one or more of the mobile network devices, or one or more transmission parameters of the free space optical transmitter, for optimization of one or more of the controllable devices executing the determined service requirements, based on the performance metrics.

13. A method comprising:

positioning a mobile network device for movement along a track rail structure of a ceiling-mounted track enclosure, the ceiling-mounted track enclosure further comprising a beam transmission cavity constructed and arranged for accommodating a collimated light beam having a prescribed cross-sectional area and having been transmitted into the beam transmission cavity by a free space optical transmitter, the track rail structure constructed and arranged for supporting movement of the mobile network device along the track rail structure without obstruction of the collimated light beam;

receiving, by the mobile network device at a selected detection area within the cross-sectional area, a modulated light signal transmitted within the collimated light beam, the selected detection area allocated exclusively to the mobile network device and the selected detection area substantially smaller than the prescribed cross-sectional area; and moving, by the mobile network device, toward an identifiable destination position of the track rail structure by a determined arrival time in response to the mobile network device detecting a movement instruction in the modulated light signal.

14. The method of claim 13, wherein the modulated light signal is received at a data rate of at least ten gigabits per second (10 Gb/s), the method further comprising:

parsing streaming data from the modulated light signal received at the selected detection area; and forwarding the streaming data to an apparatus coupled to the mobile network device.

15. The method of claim 13, wherein the mobile network device comprises an optical sensor having an area substantially corresponding to the selected detection area, the method further comprising the mobile network device moving the optical sensor to the selected detection area in response to a sensor position instruction retrieved by the mobile network device from one of a local memory circuit or the collimated light beam.

16. The method of claim 13, wherein the modulated light signal is received in a first direction of the beam transmission cavity, the method further comprising transmitting, at the selected detection area, a second collimated light beam in the first direction for reception by an optical receiver positioned at an end of the beam transmission cavity that is opposite the corresponding end used for transmission of the collimated light beam by the free space optical transmitter.

17. An apparatus comprising:

a motor structure configured for moving the apparatus along a track rail structure of a ceiling-mounted track enclosure, the ceiling-mounted track enclosure further comprising a beam transmission cavity constructed and arranged for accommodating a collimated light beam having a prescribed cross-sectional area and having been transmitted into the beam transmission cavity by a free space optical transmitter, the track rail structure constructed and arranged for supporting movement of the apparatus along the track rail structure without obstruction of the collimated light beam;

an optical receiver configured for receiving, at a selected detection area within the cross-sectional area, a modulated light signal transmitted within the collimated light beam, the selected detection area allocated exclusively to the apparatus and the selected detection area substantially smaller than the prescribed cross-sectional area; and a controller circuit configured for detecting a movement instruction in the modulated light signal, the controller circuit configured for causing the motor structure to move the apparatus toward an identifiable destination position of the track rail structure by a determined arrival time in response to the movement instruction.

18. The apparatus of claim 17, wherein the modulated light signal is received at a data rate of at least ten gigabits per second (10 Gb/s), the controller circuit further configured for:

parsing streaming data from the modulated light signal received at the selected detection area; and forwarding the streaming data to controllable device coupled to the apparatus.

19. The apparatus of claim 17, wherein:

the apparatus further comprises a memory circuit;

the optical receiver comprises an optical sensor having an area substantially corresponding to the selected detection area, the optical receiver configured for moving the optical sensor to the selected detection area in response to a sensor position instruction retrieved by apparatus from one of the memory circuit or the collimated light beam.

20. The apparatus of claim 17, wherein:

the modulated light signal is received in a first direction of the beam transmission cavity;

the apparatus further comprises an optical transmitter configured for transmitting, at the selected detection area, a second collimated light beam in the first direction for reception by a second optical receiver positioned at an end of the beam transmission cavity that is opposite the corresponding end used for transmission of the collimated light beam by the free space optical transmitter.

* * * * *